United States Patent
Yamada et al.

(10) Patent No.: US 7,098,287 B2
(45) Date of Patent: Aug. 29, 2006

(54) TWO-COMPONENT PROTECTIVE LUSTERING AGENT FOR COATED SURFACE

(75) Inventors: Takeshi Yamada, Higashimurayama (JP); Satoshi Sumida, Higashimurayama (JP)

(73) Assignee: Willson Co., Ltd., Tokyo (JP)

( * ) Notice: Subject to any disclaimer, the term of this patent is extended or adjusted under 35 U.S.C. 154(b) by 287 days.

(21) Appl. No.: 10/470,718

(22) PCT Filed: Jan. 18, 2002

(86) PCT No.: PCT/JP02/00352

§ 371 (c)(1),
(2), (4) Date: Jul. 31, 2003

(87) PCT Pub. No.: WO02/061007

PCT Pub. Date: Aug. 8, 2002

(65) Prior Publication Data

US 2004/0054046 A1    Mar. 18, 2004

(30) Foreign Application Priority Data

Jan. 31, 2001  (JP) ............................. 2001-024669

(51) Int. Cl.
*C08G 77/06* (2006.01)
(52) U.S. Cl. .......................... 528/34; 528/42
(58) Field of Classification Search ............. 528/42, 528/34
See application file for complete search history.

(56) References Cited

U.S. PATENT DOCUMENTS 2,902,467 A * 9/1959 Chipman .................... 528/14

FOREIGN PATENT DOCUMENTS

| JP | 8-277388 | 10/1966 |
|---|---|---|
| JP | 61-034081 | 2/1986 |
| JP | 64-051477 | 2/1989 |
| JP | 6-192621 | 7/1994 |
| JP | 6-192621 A | 7/1994 |
| JP | 7-003211 | 1/1995 |
| JP | 7-196988 | 8/1995 |
| JP | 9-053065 | 2/1997 |
| JP | 9-104861 | 4/1997 |
| JP | 9-104861 A | 4/1997 |
| JP | 10-219235 | 8/1998 |
| JP | 10-219235 A | 8/1998 |
| JP | 11-349930 | 12/1999 |
| JP | 11-349930 A | 12/1999 |
| JP | 2000-073013 | 3/2000 |
| JP | 2000-73013 A | 3/2000 |

* cited by examiner

*Primary Examiner*—Margaret G. Moore
(74) *Attorney, Agent, or Firm*—Birch, Stewart, Kolasch, & Birch, LLP

(57) ABSTRACT

This invention provides a two-component protective lustering agent which is applied to the coated surface of automobiles and the like to form a film displaying excellent luster, water repellency and stainproofing property over a long period of time and the agent is easy to wipe off in the finish after application. The two-component protective lustering agent is applied to the coated surface of automobiles and the like by mixing the two components immediately before use and comprises a liquid agent A containing a room temperature curable modified silicone resin and a fluorosilane compound as effective components and a liquid agent B containing a reaction catalyst exerting a catalytic action on the aforementioned room temperature curable modified silicone resin and fluorosilane compound.

10 Claims, No Drawings

TWO-COMPONENT PROTECTIVE LUSTERING AGENT FOR COATED SURFACE

This application is the national phase under 35 U.S.C. § 371 of PCT International Application No. PCT/JP02/00352 which has an International filing date of Jan. 18, 2002, which designated the United States of America.

FIELD OF TECHNOLOGY

This invention relates to protective lustering agents which are applied to the coated surface of automobiles, trains, airplanes, office furniture, outer walls of buildings and the like to protect the coated surface against staining and at the same time provide the coated surface with luster and water repellency.

BACKGROUND TECHNOLOGY

The coated surface of automobiles, trains, airplanes, office furniture, outer walls of buildings and the like is exposed at all times to dusts, exhausts, asphalt and pitch, airborne mists from construction sites, acid rains, solar rays and other natural elements and the coated surface becomes stained and suffers deterioration such as fading of color and loss of luster as time passes. In the case of automobiles, for example, a variety of car waxes, mainly composed of wax that forms a lustrous film and silicone oil that fluidizes the wax and provides the resulting film with water repellency, have been proposed and put on the market to prevent staining and deterioration of the coated surface of automobiles.

Wax and silicone oil being their main components, the conventional car waxes can satsifactorily fulfil the function of protecting the coating itself. However, when such car wax is applied to the coated surface, a film being formed on the surface has adhesive properties and staining materials rather readily adhere to the film surface; the film then fails to show a prolonged effect for preventing staining (stainproofing property) and, as a result, produces a short-lived effect for providing the coated surface with luster and water repellency.

Moreover, since the conventional car waxes form adhesive films on the coated surface, a great deal of time and labor must be spent to wipe off excess of the wax after application. In waxing automobiles, this wiping work is extremely troublesome and, in the long run, waxing is performed not so frequently as desirable thereby primarily causing accelerated deterioration of the coated surface.

Under the circumstances, the inventors of this invention have conducted extensive studies to solve a variety of problems associated with the conventional car waxes such as loss of luster in a short time, adhesion of staining materials, deterioration of water repellency and the like. They have obtained the following results and completed this invention; a liquid agent A containing a room temperature curable modified silicone resin which cures at room temperature in the presence of a specified reaction catalyst to form a lustrous stainproof film and a fluorosilane compound which reacts in the presence of a specified reaction catalyst to form a water-repellent stainproof film and a liquid agent B containing a reaction catalyst exerting a curing and/or catalytic action on the aforementioned room temperature curable modified silicone resin and fluorosilane compound are prepared and the two liquid agents, when mixed immediately before use and applied to the coated surface, form a film which maintains luster and exhibits excellent stainproofing and water-repellent properties over a long period of time while an excess of the mixed liquid agents can be wiped off satisfactorily in the finish.

Accordingly, an object of this invention is to provide a two-component protective lustering agent which is applied to the coated surface of automobiles and the like to form a film capable of exhibiting excellent luster, water repellency and stainproofing property over a long period of time and easy to wipe off in the finish after application.

DISCLOSURE OF THE INVENTION

This invention relates to a two-component protective lustering agent for the coated surface which is applied to the coated surface by mixing the two components immediately before use and comprises a liquid agent A containing a room temperature curable modified silicone resin and a fluorosilane compound as effective components and a liquid agent B containing a reaction catalyst exerting a catalytic action on the aforementioned room temperature curable modified silicone resin and fluorosilane compound as an effective component.

In this invention, room temperature curable modified silicone resins constituting the liquid agent A are satisfactorily silicone resins which have such groups as alkoxy, hydroxyl, silanol, carboxyl, hydrogen and alcohol and cure at room temperature in the presence of a specified reaction catalyst, preferably alkoxy-modified silicone resins having lower alkoxy groups such as methoxy and ethoxy, carboxyl-modified silicone resins or hydroxyl-modified silicone resins, and they can be used singly or as a mixture of two kinds or more.

Concrete examples of room temperature curable modified silicone resins of this type from the viewpoint of both water-repellent and stainproofing properties are commercial products of the following trade names: XS66-B0704, XS66-A0399, XR31-B0270 and XR31-B1410 available from GE Toshiba Silicones Co., Ltd; FZ-3711, FZ-3722, FZ-3704 and FZ-3703 available from Nippon Unicar Co., Ltd.; DC-3037, SR-2402 and BY16-606 available from Toray Dow Corning Silicone Co., Ltd.; KR-500, KF-851, KF-6001, X22-3710, KC-89 and KR-213 available from Shin-Etsu Silicone Co., Ltd. Moreover, SR-2450 which is a water-repellent product available from Toray Dow Corning Silicone Co., Ltd. can be cited as an example suitable for use together with a room temperature curable modified silicone resin of good stainproofing property.

A fluorosilane compound constituting the liquid agent A together with the aforementioned room temperature curable modified silicone resin may be any fluorosilane which reacts in the presence of a reaction catalyst to form a siloxane linkage and its examples include fluoroalkylsilanes and fluoropolyethersilanes.

The aforementioned fluoroalkylsilanes are represented by a general formula $Rf\text{-}SiR_1R_2R_3$ (wherein Rf is a fluorine-substituted alkyl group containing 3–20 carbon atoms and 3 or more fluorine atoms and $R_1$, $R_2$ and $R_3$ are respectively halogen atoms, lower alkoxy groups containing 1–5 carbon atoms, acetoxy groups, hydroxyl groups, saturated and unsaturated aliphatic hydrocarbon groups, cyclic aliphatic hydrocarbon groups, aromatic hydrocarbon groups, or hydrogen atoms, either identical with or different from one another); the halogen atoms, exclusive of fluorine, include chlorine, bromine and iodine, the saturated and unsaturated aliphatic hydrocarbon groups include methyl, ethyl, propyl, hexyl, decyl and octadecyl, the cyclic aliphatic hydrocarbon groups include cyclopentyl and cyclohexyl and the aromatic hydrocarbon groups include phenyl, benzyl and naphthyl.

Concrete examples of useful fluoroalkylsilanes are $CF_3(CF_2)_5CH_2CH_2Si(OCH_3)_3$, $CF_3(CF_2)_5CH_2CH_2Si(OC_2H_5)_3$, $CF_3(CF_2)_7CF_2CF_2Si(OCH_3)_3$, $CF_3(CF_2)_7CH_2CH_2SiCH_3(OCH_3)_2$, $CF_3(CF_2)_7CH_2CH_2Si(OC_2H_5)_3$ and $CF_3(CF_2)_7H_2CH_2Si[OCH(CH_3)_2]_3$.

A concrete example of useful fluoropolyethersilanes is FLUOROLINK7007 (tradename of Ausimont S.p.A.).

A reaction catalyst which constitutes the aforementioned liquid agent B and exerts a catalytic action on the room temperature curable modified silicone resin and the fluorosilane compound in the liquid agent A is exemplified by organometallic compounds, acids, alkalis and amino compounds. Either a single catalyst which exerts a catalytic action on both of the room temperature curable modified silicone resin and the fluorosilane compound or a combination of two catalysts, one acting on the room temperature curable modified silicone resin and the other on the fluorosilane compound, may be used as such reaction catalyst. Moreover, a plurality of catalysts exerting the same catalytic action may be used.

The aforementioned organometallic compounds include organotin compounds such as dibutyltin trimethylhexanoate [$(CH_3C(CH_3)_2CH_2CH(CH_3)CH_2COO—)_2Sn(—C_4H_9)_2$], dibutyltin dioctoa dibutyltin diacetate and dibutyltin dilaurate and metal chelates such as aluminum tris(acetylacetone), aluminum tris(ethyl acetoacetate), aluminum diisopropoxy(ethyl acetoacetate), titanium acetylacetone, zirconium acetylacetone, zirconium tris(acetylacetone), titanium tetrakis(ethylene glycol monomethyl ether), titanium tetrakis(ethylene glycol monoethyl ether), titanium tetrakis(ethylene glycol monobutyl ether), zirconium tetrakis(ethylene glycol monomethyl ether), zirconium tetrakis(ethylene glycol monoethyl ether) and zirconium tetrakis(ethylene glycol monobutyl ether). The acids include mineral acids such as hydrochloric acid, nitric acid, sulfuric acid and phosphoric acid and organic acids such as formic acid, acetic acid, oxalic acid and trifluoroacetic acid. The alkalis include inorganic bases such as ammonia, sodium hydroxide and potassium hydroxide and organic bases such as ethylenediamine and alkanolamines. The amino compounds include amino-modified silicones, aminosilanes, silazanes and amines.

The aforementioned liquid agents A and B are mixed in such a manner as to give a coating which contains normally 1–20 wt %, preferably 4–10 wt %, of the room temperature curable modified silicone resin, normally 0.05–10 wt %, preferably 0.1–5 wt %, of the fluorosilane compound and normally 0.01–10 wt %, preferably 0.05–5 wt %, of the reaction catalyst. A coating solution with less than 1 wt % of the room temperature curable modified silicone resin fails to exhibit luster and water repellency while one with more than 20 wt % makes the finish difficult because of lack of uniformity in luster. A coating solution with less than 0.05 wt % of the fluorosilane compound provides stainproofing property with difficulty while one with more than 10 wt % deteriorates in long-term durability of water repellency. Furthermore, a coating solution with less than 0.01 wt % of the reaction catalyst causes a problem of incomplete curing while one with more than 10 wt % causes a problem of narrowed latitude in workability.

As for a solvent constituting the aforementioned liquid agent A, any solvent which can dissolve the components of the liquid agent A or a room temperature curable modified silicone resin, a fluorosilane compound and the like without reaction and is compatible with the liquid agent B is satisfactory and suitable solvents include petroleum-based solvents such as petroleum naphtha, solvent naphtha, petroleum ether, petroleum benzine, isoparaffin, normal paraffin, decalin, industrial gasoline, liquid paraffin, ligroin and kerosine, alcohol-based solvents such as methanol, ethanol, n-propanol and isopropyl alcohol, cyclic silicones such as octamethylcyclotetrasiloxane, decamethylcyclopentasiloxane and dodecamethylcyclohexasiloxane and solvents based on methylpolysiloxanes of low degree of polymerization such as octamethyltrisiloxane and decamethyltetrasiloxane. These solvents can be used either singly or as a mixture of two kinds or more.

The same argument holds for a solvent which constitutes the aforementioned liquid agent B. Any solvent which can dissolve the components of the liquid agent B, the reaction catalyst and the like without reaction and is compatible with the liquid agent A is satisfactory and, likewise, suitable solvents include petroleum-based solvents such as petroleum naphtha, solvent naphtha, petroleum ether, petroleum benzine, isoparaffin, normal paraffin, decalin, industrial gasoline, liquid paraffin, ligroin and kerosine, alcohol-based solvents such as methanol, ethanol, n-propanol and isopropyl alcohol, cyclic silicones such as octamethylcyclotetrasiloxane, decamethylcyclopentasiloxane and dodecamethylcyclohexasiloxane and solvents based on methylpolysiloxanes of low degree of polymerization such as octamethyltrisiloxane and decamethyltetrasiloxane. These solvents can be used either singly or as a mixture of two kinds or more.

The solvent in the liquid agent A and the one in the liquid agent B may be identical with or different from each other as long as they satisfy the aforementioned requirements for the two liquid agents.

Furthermore, it is allowable in accordance with this invention to add a third component besides the respective components of the aforementioned liquid agents A and B in order to improve still further those performances which are required for a protective lustering agent for the coated surface such as maintaining luster, water repellency, stainproofing property, detergent property, and ease of wiping in the finish or to provide a different kind of performances such as stabilizing the solution, increasing the adhesiveness of films and providing antiseptic property. Such third component is selected, for example, from high-melting waxes, organic resin powders, nonvolatile oils, thermoplastic resins, film-forming improvers and detergents and may contain one kind or two kinds or more of selected materials. The third component may be added to the liquid agent A and/or the liquid agent B in advance and unless the third component reacts with the components of the liquid agent A or B, it may be added to either A or B or it may be divided and added to both A and B. However, from the standpoint of storage stability of the liquid agent A, the third component is preferably added to the liquid agent B unless it reacts with the reaction catalyst contained in the liquid agent B. It is also allowable to prepare the third component as a third liquid agent, consisting of either one or two or more parts, separately from the liquid agents A and B and add immediately before use.

The aforementioned high-melting waxes are added for the purpose of planarizing the film being formed and improving luster still further and preferably have a melting point of 80° C. or above in order not to affect adversely stainproofing property. Concrete examples are vegetable waxes such as carnauba wax, petroleum-based waxes such as microciystalline wax, polyethylene wax, ester wax and oxide wax, waxes synthesized from fats and oils such as hardened castor oil, mineral waxes such as montan wax and waxes based on fatty amides. Of these waxes, polyethylene wax and fatty amide-based wax are preferred.

The organic resin powders and nonvolatile oils are added to facilitate the work of wiping off an excess of the protective lustering agent in the finish. Examples of the organic resin powders are polyethylene, silicone resin, polytetrafluoroethylene, ethylene-vinyl acetate copolymer resin, polypropylene, microcrystalline cellulose, nylon, silicone rubber, chitosan, polystyrene, benzoguanamine-melamine condensation product, acrylic resin and phenolic resin. Resin powders of irregular form are preferred. Examples of the nonvolatile oils are alkylpolysiloxanes, spindle oil, isoparaffinic hydrocarbon oil and fluorine-continining oil.

The thermoplastic resins are added for the purpose of improving durability of water repellency. Any resin soluble in the solvent in use is acceptable and examples of such resin are petroleum resins, silicone resins, acrylic resins, fluoroplastics and terpene resins. The film forming improvers are added to improve adhesion of films and preferred examples are silane compounds such as aminosilanes, epoxysilanes and methacrylsilanes. The detergents are added to provide a cleaning ability and exemplified by surfactants, abrasives and the like.

The addition of the aforementioned third component is controlled so that the high-melting wax accounts for 0.01–10 wt %, preferably 0.1–5 wt %, the organic resin powder for 0.1–15 wt %, preferably 0.5–10 wt %, the nonvolatile oil for 0.01–10 wt %, preferably 0.1–5 wt %, the thermoplastic resin for 0.01–5 wt %, preferably 0.05–1 wt %, the film-forming improver for 0.01–5 wt %, preferably 0.05–2 wt %, and the detergent for 0.1–10 wt %, preferably 0.2–5 wt %, in the coating solution obtained by mixing the liquid agents A and B. Addition of the third component in an amount less than the aforementioned range cannot attain the original objective. On the other hand, addition in excess of the aforementioned range causes various problems such as the following: an excess of the high-melting wax deteriorates workability; an excess of the organic resin powder increases the powdery quality thereby contributing to formation of thinner films and adversely affecting the prolonged performance of water repellency; an excess of the nonvolatile oil hinders curing of the film; an excess of the thermoplastic resin makes it difficult to perform the wiping work in the finish; an excess of the film-forming improver develops irregularity in luster in the finish; and an excess of the detergent deteriorates the performance of water repellency.

In this invention, there is no specific restriction on the method for packing the liquid agents A and B after preparation as long as the two liquid agents are accommodated until immediately before application to the coated surface. In the case of a two-component protective lustring agent for automotive use, for example, the liquid agents A and B required for one car are respectively divided into small portions and stored in small containers; immediately before application to the coated surface of a car, the liquid agents A and B stored respectively in small containers are transferred to a relatively large container and mixed thoroughly to prepare a coating solution. Or, one of the liquid agents A and B (for example, A) is stored in a relatively large container and the other (for example, B) in a small container, B is transferred to A immediately before application to the coated surface of a car and mixed thoroughly to prepare a coating solution.

In the preparation of a coating solution by mixing the liquid agents A and B, it is necessary to control the ratio of the two agents in such a manner as to obtain a protective lustering agent of proper composition for the coated surface. Although the ratio is determined by the compositions of the two, it is advisable to design the compositions of the two so that the mixing ratio of the two on a volume basis falls in the range of 1:100 to 100:1 in consideration of the packing form and the method of handling.

As for the method for using the two-component protective lustering agent of this invention prepared in the aforementioned manner, the liquid agent A and the liquid agent B are mixed in a specified ratio immediately before application, the resultant coating solution is applied to the coated surface of a car by means of a towel, sponge, nonwoven fabric and tissue paper, the solvent in the applied coating solution is allowed to volatilize and the work is finished by wiping off the excessive components on the coated surface with the use of a material which does not scratch the surface such as towel, nonwoven fabric and frieze.

PREFERRED EMBODIMENTS OF THE INVENTION

A suitable mode to practice this invention will be described concretely below with reference to the accompanying examples and comparative examples.

EXAMPLES 1–13 and COMPARATIVE EXAMPLES 1–5

The liquid agents A and B are respectively prepared by mixing the following materials in the ratios shown in Tables 1 and 2: XR31-B0270 (room temperature curable alkoxy-modifed silicone resin, available from GE Toshiba Silicones Co., Ltd.), FZ3704 (room temperature curable alkoxy-modified silicone resin, available form Nippon Unicar Co., Ltd.) and KR500 (room temperature curable alkoxy-modified silicone resin, available form Shin-Etsu Silicone Co., Ltd.) as a room temperature curable modified silicone resin; $CF_3(CF_2)_7CH_2CH_2Si(OC_2H_5)_3$ or AY43-158E (available from Toray Dow Corning Silicone Co., Ltd.), $CF_3(CF_2)_7CH_2CH_2Si(OCH_3)_3$ or KBM7803 (available from Shin-Etsu Silicone Co., Ltd.), $CF_3(CF_2)_7CH_2CH_2Si[OCH(CH_3)_2]_3$ or XC95-A9715 (available from GE Toshiba Silicones Co., Ltd.) FLUOROLINK7007 or fluoropolyethersilane (available from Ausimont S.p.A.) as a fluorosilane compound; dibutyltin dilaurate (available from Katsuta Kako K.K.), titanium acetylacetone (NACEM titan, available from Nihon Kagaku Sangyo Co., Ltd.) and dibutyltin trimethylhexanoate (available from Hope Chemical Co., Ltd.) as a reaction catalyst; Armowax EBS-B (ethylene bisstearamide, available from Lion Corporation) and Poly 1000 (polyethylene, available from Toyo-Petrolite Co., Ltd.) as a high-melting wax; Trefil R902A (silicone resin powder, available from Toray Dow Corning Silicone Co., Ltd.), Tospearl 240 (silicone resin powder, available from GE Toshiba Silicones Co., Ltd.) and Aflon L-169J (PTFE powder, available from Asahi Glass Co., Ltd.) as an organic resin powder; BR-115 (acrylic resin, available from Mitsubishi Rayon Co., Ltd.), Lumiflon LF-810 (fluoroolefin-vinyl ether copolymer, available from Asahi Glass Co., Ltd.) and KF9002 (octamethylcyclotetrasiloxane, available from Shin-Etsu Silicone Co., Ltd.) as a thermoplastic resin; IP1620 (isoparaffin, available from Idemitsu Oil Co., Ltd.), isopropyl alcohol (available from Nippon Mitsubishi Oil Corporation), Exxsol D-40 (naphthenic solvent, available from Exxon), Shellsol 71 (isoparaffinic solvent, available from Shell), LAWS (aromatic solvent, available from Shell)

and deionized water as a solvent; Emalex 603 (polyoxyethylene stearyl ether, available from Nihon Emulsion Co., Ltd.) as a surfactant; and Celite 219 (kieselguhr, available from Johns-Manville Corp.) and AM21 (fine alumina powder, available from Sumitomo Chemical Co., Ltd.) as a detergent.

The liquid agents A and B thus prepared were mixed in the ratios shown in Tables 1 and 2 immediately before application to the coated surface to give coating solutions for Examples 1–13 and Comparative Examples 1–3. In addition, commercially available protective lustering agents a and b were used in Comparative Examples 4 and 5. Ease of wiping in the finish after application, luster immediately after application, luster one month after application, stainproofing property, water repellency immediately after application and water repellency one month after application were respectively evaluated according to the methods described below. The results are shown in Table 3.

[Ease of Wiping in the Finish After Application]

The test coating solution was applied to the hood (or the coated surface in the test) of a dark-colored car by the use of nonwoven fabric, the solvent in the solution was allowed to volatilize, the surface was wiped with a dry clean towel and the work was continued until a constant condition was reached under visual observation. The results were evaluated in the following four ranks; ⊚, easy to finish clean and even; ○, some effort required to finish clean and even; Δ, cannot be finished clean with some unevenness remaining; X, cannot be wiped off.

[Luster, Water Repellency and Stainproofing Property]

The surface of the hood (or the coated surface in the test) of a dark-colored (or light-colored or white) car was divided into sections of a suitable size by a masking tape, the coating solution was applied to the sections by nonwoven fabric, the solvent was allowed to volatilize, and the surface was wiped with a dry clean towel. Thereafter, the car was left outdoors, driven for 100 km or more every unit time which is one week and washed once with water and visually observed for luster, water repellency and stainproofing property every unit time.

Luster immediately after application of the coating solution was evaluated in the following four ranks: ⊚, extremely deeply lustrous; ○, deeply lustrous; Δ, lustrous; X, practically lacking luster. Likewise, luster one month after application were evaluated in the following four ranks: ⊚, same as immediately after application; ○, practically the same as immediately after application; Δ, slight deterioration in luster; X, practically lacking luster.

Water repellency was evaluated by putting water on the surface by a hose and observing the shape of water drops formed. Water repellency immediately after application was evaluated in the following four ranks: ⊚, water drops formed in good proportion; ○, water drops formed but not in good proportion; Δ, water drops not formed, but water drained; X, water remained and drained with difficulty. Likewise, water repellency one month after application was evaluated in the following four ranks: ⊚, same as immediately after application; ○, practically the same as immediately after application; Δ, slight deterioration in water repellency; X, practically lacking water repellency.

Stainproofing property was evaluated in the following four ranks: ⊚, same as immediately after application; ○, slight staining; Δ, some staining; X, considerable staining.

TABLE 1

| | | Example (wt %) | | | | | | | | | | | | |
|---|---|---|---|---|---|---|---|---|---|---|---|---|---|---|
| | Component | 1 | 2 | 3 | 4 | 5 | 6 | 7 | 8 | 9 | 10 | 11 | 12 | 13 |
| Composition of liquid agent A | | | | | | | | | | | | | | |
| Room temperature curable modified silicone resin | FZ3704 | 5 | 5 | | | | | | | 6 | | | | | |
| | KR500 | | | 4 | 4 | | | | 8 | | | | | | |
| | XR31-B0270 | | | | | 6 | 6 | | | | 7 | 6 | 4 | 4 | 4 |
| Fluorosilane compound | $CF_3(CF_2)_7CH_2CH_2Si(OCH_3)_3$ | | | | | | | | 0.5 | | | | | | 0.5 |
| | $CF_3(CF_2)_7CH_2CH_2Si(OC_2H_5)_3$ | | 0.3 | 0.3 | | 0.5 | 0.5 | | | 5 | 0.5 | 0.3 | | | |
| | $CF_3(CF_2)_7CH_2CH_2Si\{OCH(CH_3)_2\}_3$ | | | | 0.1 | | | 0.2 | | | | | | | |
| | FLUOROLINK7007 | 0.2 | | | | | | | | | | | | 0.2 | |
| Solvent | IP1620 | 44.8 | | | 45.9 | 42.5 | 42.5 | 41.8 | 21.75 | 38 | 42.5 | 44.7 | 44.8 | 44.5 |
| | Isopropyl alcohol | | 44.7 | | | 1 | 1 | | 21.75 | | 1 | 1 | 1 | 1 | |
| | Exxsol D-40 | | | 45.7 | | | | | | | | | | | |
| Composition of liquid agent B | | | | | | | | | | | | | | |
| Reaction catalyst | Dibutyltin dilaurate | 1 | 1 | 1 | | | | | 1.5 | | | | | | |
| | Titanium acetylacetone | | | | 0.05 | | | | | | | | | | |
| | Dibutyltin trimethylhexanoate | | | | | 0.9 | 5 | 1 | | 0.8 | 0.9 | 0.5 | 0.5 | 0.5 | |
| High-melting wax | Poly 1000 | | 2 | | | | | 10 | | | | | | | |
| | Armowax EBS-B | | | | | 0.2 | 0.1 | | 0.2 | 0.2 | 0.2 | 0.1 | 0.1 | 0.1 | |
| Organic resin powder | Tospearl 240 | | | 5 | | | 5 | | | 10 | | | | | |
| | Trefil R902A | | | | | 5 | | | 5 | | 5 | 3 | 3 | 3 | |
| | Aflon L-169J | | | | 2.5 | | | | | | | | | | |
| Thermoplastic resin | BR-115 | | | | 0.25 | | | | | 0.3 | | | | | |
| | Lumiflon LF-810 | | | | | | 0.5 | | 0.5 | | 0.5 | 0.5 | 0.5 | 0.5 | |
| | KF9002 | | | | 0.5 | | | | | | | | | | |
| Solvent | Shellsol 71 | | | 44 | 47.2 | | 39.4 | | | | 43.4 | 13.9 | 8.9 | 8.9 | |
| | Isopropyl alcohol | 49 | | | | | | 36 | 42.8 | 38.7 | | | | | |
| | LAWS | | | 47 | | 43.4 | | | | | | | | | |
| Surfactant | Emalex 603 | | | | | | | | | | | 2 | 2 | 2 | |
| Detergent | Celite 219 | | | | | | | 3 | | | 5 | | | | |
| | AM21 | | | | | | | | | | | | | 5 | |
| | Deionized water | | | | | | | | | | | 30 | 30 | 30 | |

TABLE 2

| Component | | Comparative example (wt %) | | |
|---|---|---|---|---|
| | | 1 | 2 | 3 |
| Composition of liquid agent A | | | | |
| Room temperature curable modified silicone resin | FZ3704 | | | |
| | KR500 | | 5 | |
| | XR31-B0270 | 6 | | |
| Fluorosilane compound | $CF_3(CF_2)_7CH_2CH_2Si(OCH_3)_3$ | | | |
| | $CF_3(CF_2)_7CH_2CH_2Si(OC_2H_5)_3$ | | 0.5 | |
| | $CF_3(CF_2)_7CH_2CH_2Si\{OCH(CH_3)_2\}_3$ | | | |
| | FLUOROLINK7007 | | | 0.1 |
| Solvent | IP 1620 | 43 | 43.5 | 48.9 |
| | Isopropyl alcohol | 1 | 1 | 1 |
| | Exxsol D-40 | | | |
| Composition of liquid agent B | | | | |
| Reaction catalyst | Dibutyltin dilaurate | | | 1 |
| | Titanium acetylacetone | | | |
| | Dibutyltin trimethylhexanoate | 0.9 | | |
| High-melting wax | Poly 1000 | | | |
| | Arnowax EBS-B | 0.2 | 0.2 | 0.3 |
| Organic resin powder | Tospearl 240 | | | 5 |
| | Trefil R902A | 5 | 5 | |
| | Aflon L-169J | | | |
| Thermoplastic resin | BR-115 | | | |
| | Lumiflon LF-810 | 0.5 | | 0.5 |
| | KF9002 | | 0.25 | |
| Solvent | Shellsol 71 | | 44.55 | 43.2 |
| | Isopropyl alcohol | | | |
| | LAWS | 43.4 | | |
| Surfactant | Emalex 603 | | | |
| Detergent | Celite 219 | | | |
| | AM21 | | | |
| | Deionized water | | | |

TABLE 3

| Observed item | Example | | | | | | | | | | | | | Comparative example | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 | 4 | 5 |
| Ease of wiping in the finish after application | ⊙ | ⊙ | ⊙ | ○ | ⊙ | ○ | ○ | ⊙ | ⊙ | ⊙ | ⊙ | ⊙ | ⊙ | ⊙ | ⊙ | ⊙ | ⊙ | ○ |
| Luster immediately after application | ⊙ | ⊙ | ○ | ⊙ | ⊙ | ⊙ | ⊙ | ⊙ | ⊙ | ⊙ | ⊙ | ⊙ | ⊙ | ⊙ | △ | △ | ○ | △ |
| Luster one month after application | ⊙ | ○ | ○ | ⊙ | ⊙ | ⊙ | ⊙ | ⊙ | ○ | ⊙ | ⊙ | ⊙ | ⊙ | △ | X | X | X | X |
| Stainproofing property | ⊙ | ⊙ | ⊙ | ⊙ | ⊙ | ⊙ | ⊙ | ⊙ | ⊙ | ⊙ | ○ | ⊙ | ⊙ | X | X | X | X | ⊙ |
| Water repellency immediately after application | ○ | ○ | ⊙ | ⊙ | ⊙ | ⊙ | ⊙ | ⊙ | ⊙ | ⊙ | ⊙ | ⊙ | ⊙ | △ | △ | △ | ⊙ | ○ |
| Water repellency one month after application | ○ | ○ | ⊙ | ⊙ | ⊙ | ⊙ | ⊙ | ⊙ | ⊙ | ⊙ | ○ | ○ | ○ | △ | X | X | ○ | △ |

INDUSTRIAL APPLICABILITY

Protective lustering agents of this invention can be applied to the coated surface of automobiles and the like to form films which can manifest excellent luster, water repellency and stainproofing property over a long period of time and are easy to wipe off in the finish after application.

What is claimed is:

1. A two-component protective lustering agent for the coated surface which is applied to the coated surface by mixing the two components immediately before use and comprises a liquid agent A containing a room temperature curable modified silicone resin and a fluorosilane compound of the formula $Rf-SiR_1R_2R_3$, wherein Rf is a fluorine-substituted alkyl group containing 8–20 carbon atoms and 3 or more fluorine atoms and $R_1$, $R_2$, and $R_3$ are respectively halogen atoms, lower alkoxy groups containing 1–5 carbon atoms, acetoxy groups, hydroxyl groups, saturated or unsaturated aliphatic hydrocarbon groups, cyclic aliphatic hydrocarbon groups, aromatic hydrocarbon groups, or hydrogen atoms as effective components and a liquid agent B containing a reaction catalyst exerting a catalytic action on the aforementioned room temperature curable modified silicone resin and fluorosilane compound as an effective component, wherein liciuld agents A and B provide a coating which contains 1 to 20 weight-% of the room temperature curable modified silicone resin, 0.05 to 10 weight-% of the fluorosilane compound, and 0.01 to 10 weight-% of the reaction catalyst.

2. A two-component protective lustering agent for the coated surface as described in claim 1 wherein the room temperature curable modified silicone resin is an alkoxy-modified silicone resin or a hydroxyl-modified silicone resin.

3. A two-component protective lustering agent for the coated surface as described in claim 1 wherein the reaction catalyst is one kind or two kinds or more selected from organometallic compounds, acids, alkalis and amines.

4. A two-component protective lustering agent for the coated surface as described in claim 1 wherein one kind or two kinds or more selected from high-melting waxes, organic resin powders, nonvolatile oils, thermoplastic resins, film-forming improvers and detergents are added to the liquid agent A and/or the liquid agent B.

5. A two-component protective lustering agent for the coated surface as described in claim 4 wherein the high-melting waxes are one kind or two kinds or more selected from vegetable waxes, petroleum waxes, mineral waxes, synthetic waxes and fatty amide-based waxes.

6. A two-component protective lustering agent for the coated surface as described in claim 4 wherein the detergents are one kind or two kinds or more selected from water, surfactants and abrasives.

7. A two-component protective lustering agent for the coated surface as described in any one of claims 4 to 6 wherein one kind or two kinds or more selected from high-melting waxes, organic resin powders, nonvolatile oils, thermoplastic resins, film-forming improvers and detergents constitute a third liquid agent in one or two or more parts separately from the liquid agent A and the liquid agent B.

8. The two-component protective lustering agent of claim 1, wherein Rf is a fluorine-substituted alkyl group containing 8–10 carbon atoms and 13–17 fluorine atoms.

9. The two-component protective lustering agent of claim 8, wherein Rf is a fluorine-substituted alkyl group containing 10 carbon atoms and 17 fluorine atoms.

10. A two-component protective lustering agent for the coated surface which is applied to the coated surface by mixing the two components immediately before use and comprises a liquid agent A containing a room temperature curable modified silicone resin having one kind or two kinds or more of groups selected from alkoxy group, hydroxyl group, silanol group, carboxyl group, hydrogen group and alcohol group in the molecule and a fluoropolyethersilane compound capable of forming a siloxane linkage as effective components and a liquid agent B containing a reaction catalyst exerting a catalytic action on the aforementioned room temperature curable modified silicone resin and fluorosilane compound as an effective component.

* * * * *